(12) United States Patent
Emoto et al.

(10) Patent No.: US 7,920,966 B2
(45) Date of Patent: Apr. 5, 2011

(54) NAVIGATION APPARATUSES, METHODS, AND PROGRAMS

(75) Inventors: Michiko Emoto, Anjo (JP); Shinya Miyamoto, Sapporo (JP); Kazuyoshi Yamamoto, Sapporo (JP)

(73) Assignee: Aisin AW Co., Ltd., Anjo (JP)

( * ) Notice: Subject to any disclaimer, the term of this patent is extended or adjusted under 35 U.S.C. 154(b) by 815 days.

(21) Appl. No.: 11/812,911

(22) Filed: Jun. 22, 2007

(65) Prior Publication Data

US 2008/0033642 A1 Feb. 7, 2008

(30) Foreign Application Priority Data

Jun. 30, 2006 (JP) ................................. 2006-182796

(51) Int. Cl.
*G01C 21/00* (2006.01)
*G08G 1/123* (2006.01)

(52) U.S. Cl. ............. 701/209; 701/1; 701/200; 701/201; 701/202; 701/207; 701/208; 701/210; 701/211; 701/212; 340/995.1; 340/995.11; 340/995.12; 340/995.14; 340/995.15; 340/995.19; 340/995.2; 340/995.24; 340/995.27

(58) Field of Classification Search ........ 701/1, 200–202, 701/207–212; 340/995.1–995.12, 995.14, 340/995.15, 995.19, 995.2, 995.24, 995.27
See application file for complete search history.

(56) References Cited

U.S. PATENT DOCUMENTS

| 6,587,784 | B1 * | 7/2003 | Okude et al. ................. 701/208 |
| 7,119,831 | B2 * | 10/2006 | Ohto et al. ................... 348/135 |
| 2005/0234638 | A1 * | 10/2005 | Ogaki et al. ................. 701/209 |
| 2008/0040035 | A1 * | 2/2008 | Emoto et al. ................ 701/211 |
| 2008/0162043 | A1 * | 7/2008 | Emoto et al. ................ 701/211 |

FOREIGN PATENT DOCUMENTS

| JP | A 9-318381 | 12/1997 |
| JP | A-2004-233153 | 8/2004 |
| JP | A-2004-233538 | 8/2004 |
| JP | A-2005-077381 | 3/2005 |
| JP | A-2006-098225 | 4/2006 |

* cited by examiner

*Primary Examiner* — Jack Keith
*Assistant Examiner* — Chuong P Nguyen
(74) *Attorney, Agent, or Firm* — Oliff & Berridge, PLC

(57) ABSTRACT

Navigation apparatuses, methods, and programs set a first reference point on a driving route, set a second reference point on the driving route, the second reference point being prior to the first reference point along the driving route, and set a third reference point on the driving route, the third reference point being after the first reference point along the driving route. The apparatuses, methods, and programs set a triangular area having vertices corresponding to the first reference point, the second reference point, and the third reference point and obtain three-dimensional map data around the triangular area. The apparatuses, methods, and programs set a predetermined translucent ratio for a structure included in the triangular area. The apparatuses, methods, and programs generate a moving three-dimensional image which displays the driving route overlapped with the structure set with the predetermined translucent ratio and display the generated three-dimensional motion-image.

19 Claims, 12 Drawing Sheets

NAVIGATION APPARATUSES, METHODS, AND PROGRAMS

INCORPORATION BY REFERENCE

The disclosure of Japanese Patent Application No. 2006-182796, filed on Jun. 30, 2006, including the specification, drawings and abstract is incorporated herein by reference in its entirety.

BACKGROUND

1. Related Technical Fields

Related technical fields include navigation apparatuses, and more particularly, a navigation apparatuses providing a moving three-dimensional image on a route guidance screen.

2. Description of the Related Art

In recent years, navigation apparatuses for aiding in the navigation of vehicles have become very popular. Such navigation apparatuses search for a route from a departing location to a destination, detect a location of a host vehicle by means of a GPS (Global Positioning System) satellite and/or a Gyro sensor, and display the route to destination and the current location on a map. It is important for such a navigation apparatus to provide an easily viewable display to a driver of the vehicle. For example, Japanese Unexamined Patent Application Publication No. 9-318381 discloses the technology to generate a moving three-dimensional image simulating the scene driver views.

In the case of providing guidance on a two-dimensional map, a driver needs to interpret the two-dimensional map and compare it to the actual three-dimensional scene outside the vehicle. With the moving three-dimensional image, a route is drawn on a three-dimensional map drawing (including, e.g., buildings). Based on the three-dimensional map drawing intersection guidance and so forth can be performed. With the moving three-dimensional image, the moving three-dimensional image and the actual three-dimensional scene can be easily compared. Furthermore, with the technology in Japanese Unexamined Patent Application Publication No. 9-318381, if the route and buildings are overlapped, the buildings that overlap the route are displayed translucently.

SUMMARY

However, with the technology in Japanese Unexamined Patent Application Publication No. 9-318381, the navigation system needs to determine the overlaps of route and all the buildings at all points on the route, therefore, the information processing required for implementing the method is large.

Accordingly, various exemplary implementations of the broad principles described herein may transform a display form of buildings before the buildings are reached on the route, thereby requiring less information processing.

Various exemplary implementations provide navigation apparatuses, methods, and programs that may set a first reference point on a driving route, may set a second reference point on the driving route, the second reference point being prior to the first reference point along the driving route, and may set a third reference point on the driving route, the third reference point being after the first reference point along the driving route. The apparatuses, methods, and programs may set a triangular area having vertices corresponding to the first reference point, the second reference point, and the third reference point and may obtain three-dimensional map data around the triangular area. The apparatuses, methods, and programs may set a predetermined translucent ratio to a structure included in the triangular area out of the obtained three-dimensional map data. The apparatuses, methods, and programs may generate a moving three-dimensional image which displays the driving route overlapped with the structure set with the predetermined translucent ratio and may display the generated three-dimensional motion-image.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
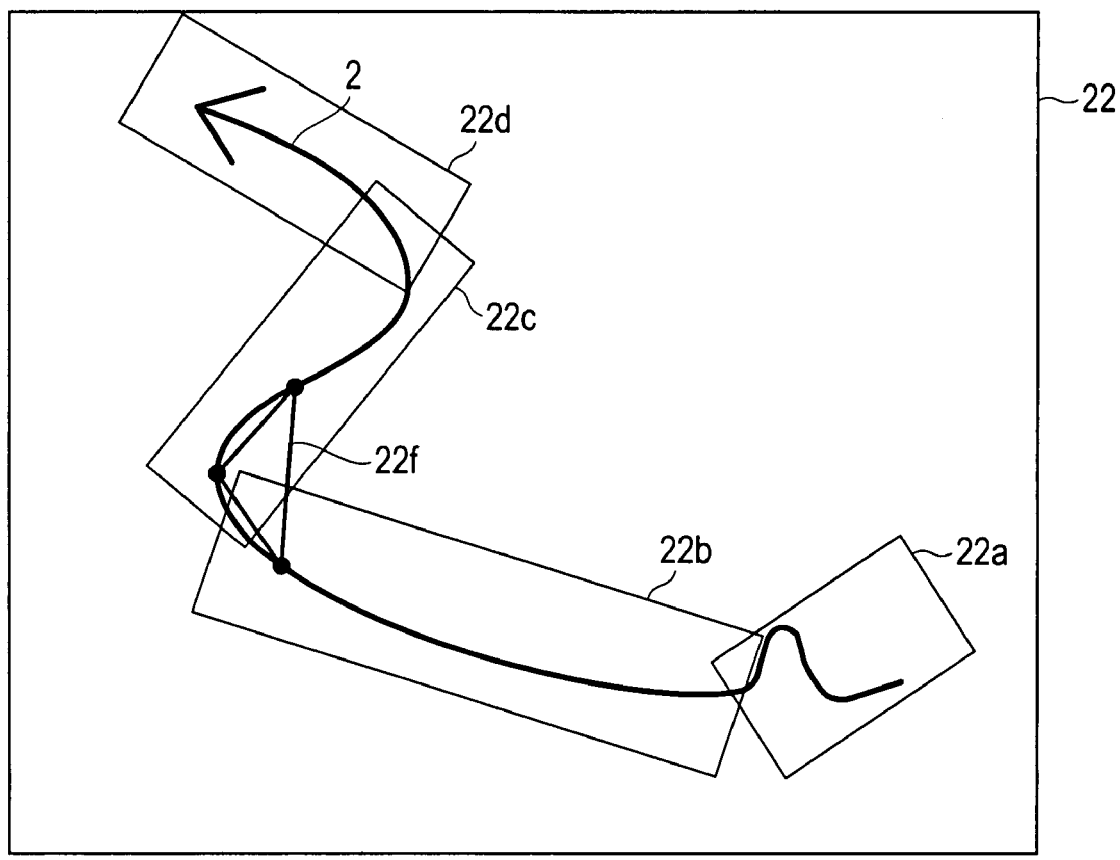
FIG. 1 is a diagram illustrating an exemplary data management method.

FIG. 1 shows an exemplary method for managing route data. As shown in FIG. 1, rectangular regions 22a through 22d along a route 2 for which data is to be read may be set in accordance with the shape of route 2 around a guidance intersection (not illustrated). Each of the rectangular regions may be set as having a centerline, which passes through two points set on the route 2. Also, if the route is curved and a vehicle makes turn, the navigation apparatus 1 may set three points, one before the turn, one during the turn, and one after the turn. The points may define a triangle region 22f that is formed with these three points.

Within the three-dimensional map data 22, the navigation apparatus 1 may set a predetermined translucent ratio to the buildings located within the triangle region 22f. By displaying the buildings located within triangle region 22f translucently all the time, the navigation apparatus 1 does not need to determine the overlaps of route and all buildings at every point where the image changes on the route 2. Accordingly, the route will not be obscured due to buildings and can be displayed with low load of information processing.

Figure 2:
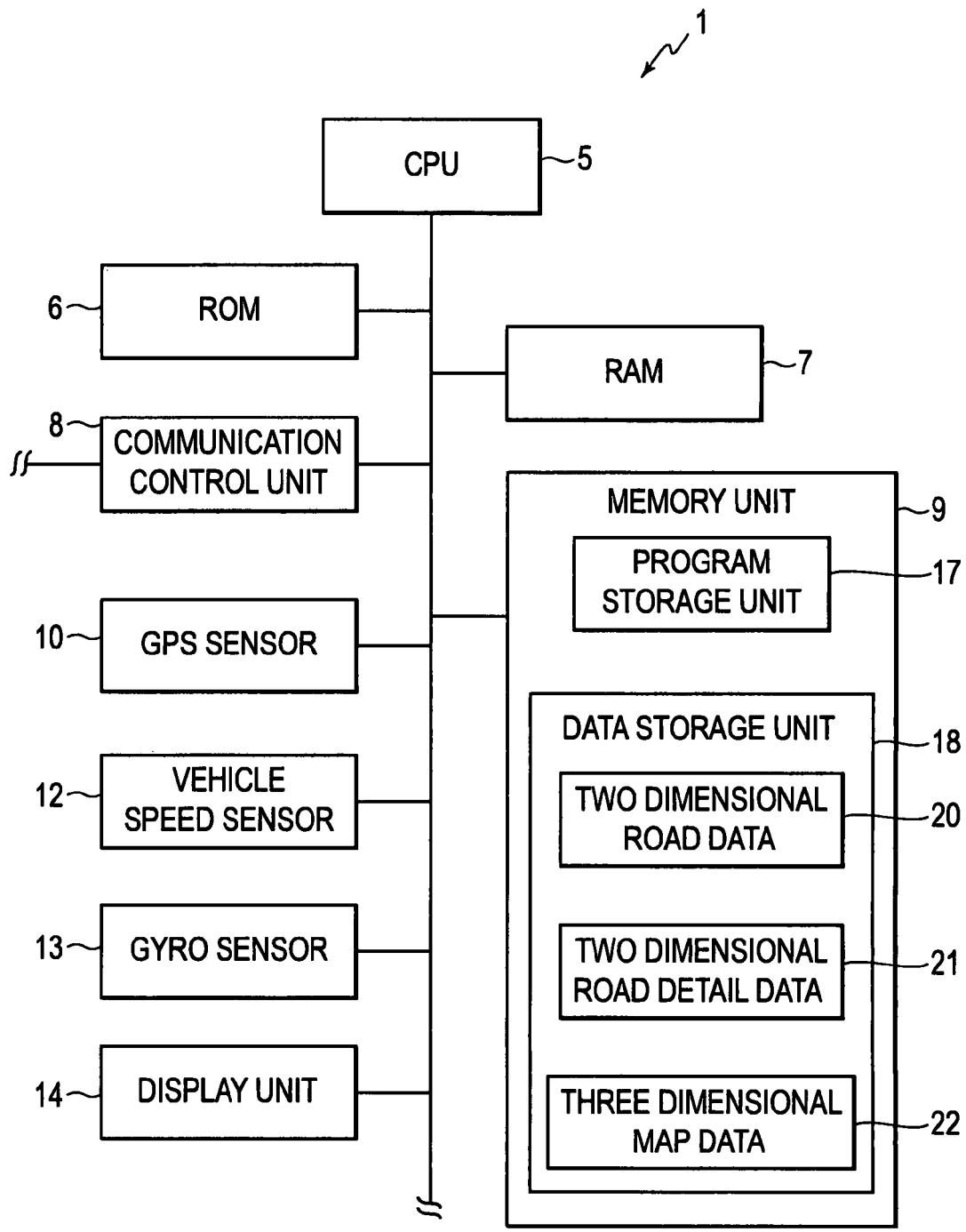
FIG. 2 is a diagram illustrating an exemplary navigation apparatus.

FIG. 2 is a diagram illustrating an example of hardware configuration of navigation apparatus. Navigation apparatus 1 may include a controller (e.g., CPU 5), a ROM 6, a RAM 7, a communication control unit 8, a storage unit 9, GPS unit 10, a vehicle speed sensor 12, gyro 13, an image display unit 14, and so forth, and these units may be connected, and may provide route guidance to a set destination.

The CPU 5 may be a central processing device, and may perform various information processing such as route search, route guidance, and so forth. The CPU 5 may control the navigation apparatus 1 based on programs stored in ROM 6, RAM 7, a storage unit 9, and so forth. The ROM 6 may be a read-only memory and may store basic programs, parameters and so forth for operating the navigation apparatus 1. The RAM 7 may be a random access memory enabling writing in/reading out. For example, it may provide a working memory for CPU 5 to perform various information processing. Map data for display may be read in to the RAM 7 from the storage unit 9. The communication control unit 8 may be a functional unit for connecting to a network such as Internet. The Navigation apparatus 1 may communicate with an external server through the communication control unit 8.

The storage unit 9 may be a storage device with mass-storage medium such as a semiconductor memory, a hard disk, an optical disk, a magneto optical disk and so forth, and may form a program storage unit 17 and a data storage unit 18. The program storage unit 17 may store an OS (Operating System), i.e., a basic program for operating the navigation apparatus 1, a route guidance program for CPU 5 to perform a route guidance processing, and so forth.

The data storage unit 18 may store map data made up of two-dimensional road data 20, two-dimensional road detail data 21, three-dimensional map data 22, and so forth. Two-dimensional road data 20 may be map data displaying a road network with links that are connecting nodes. Two-dimensional road data 20 may be used, for example, for CPU 5 to search for a route from a departing point to a destination.

The two-dimensional road detail data 21 may be the map data for CPU 5 to display a two-dimensional map on an image display unit 14. The two-dimensional road detail data 21 may include information of road traffic lanes or information relating to various facilities such as restaurants, gas stations, schools, factories, and so forth. Accordingly, it may be possible to provide detailed geographic information to the driver. The three-dimensional map data 22 may be three-dimensional city map data displaying a city with three-dimensional computer graphics using three-dimensional map data that defines three-dimensional information on structures. The term "structure" here refers to all displayed elements such as, for example, roads, railroads, buildings, ground and so forth, and each structure may be given an attribute indicating an element classification of the structure such as "road," "railroad," "building," and/or "ground."

The GPS unit 10 may receive GPS signal sent by an orbiting GPS satellite and provide it to CPU 5. The vehicle speed sensor 12 may be a sensor for detecting the speed of vehicle. The Gyro 13 may be a sensor for detecting the angular velocity of vehicle. With the GPS signal, the vehicle speed, the angular velocity and/or so forth, the CPU 5 may calculate the driving condition of vehicle such as latitude and longitude of the current location, the traveling direction, the speed, the acceleration, and/or so forth.

The image display unit 14 may include, for example, an LCD, plasma display, or other display devices, and may display the guidance screen that CPU 5 creates with two-dimensional road detail data 21, three-dimensional map data 22, and so forth. The image display unit 14 may also have a touch panel function so that the driver may set a destination or other information in the navigation apparatus 1 by touching a menu shown on the display monitor. Thus, the image display unit 14 may function as destination set receiving means for receiving a setting of a destination. Note that, although not shown, the navigation apparatus 1 may include an audio output function so that it may provide route guidance with audio beside with the guidance screen.

Figure 3:
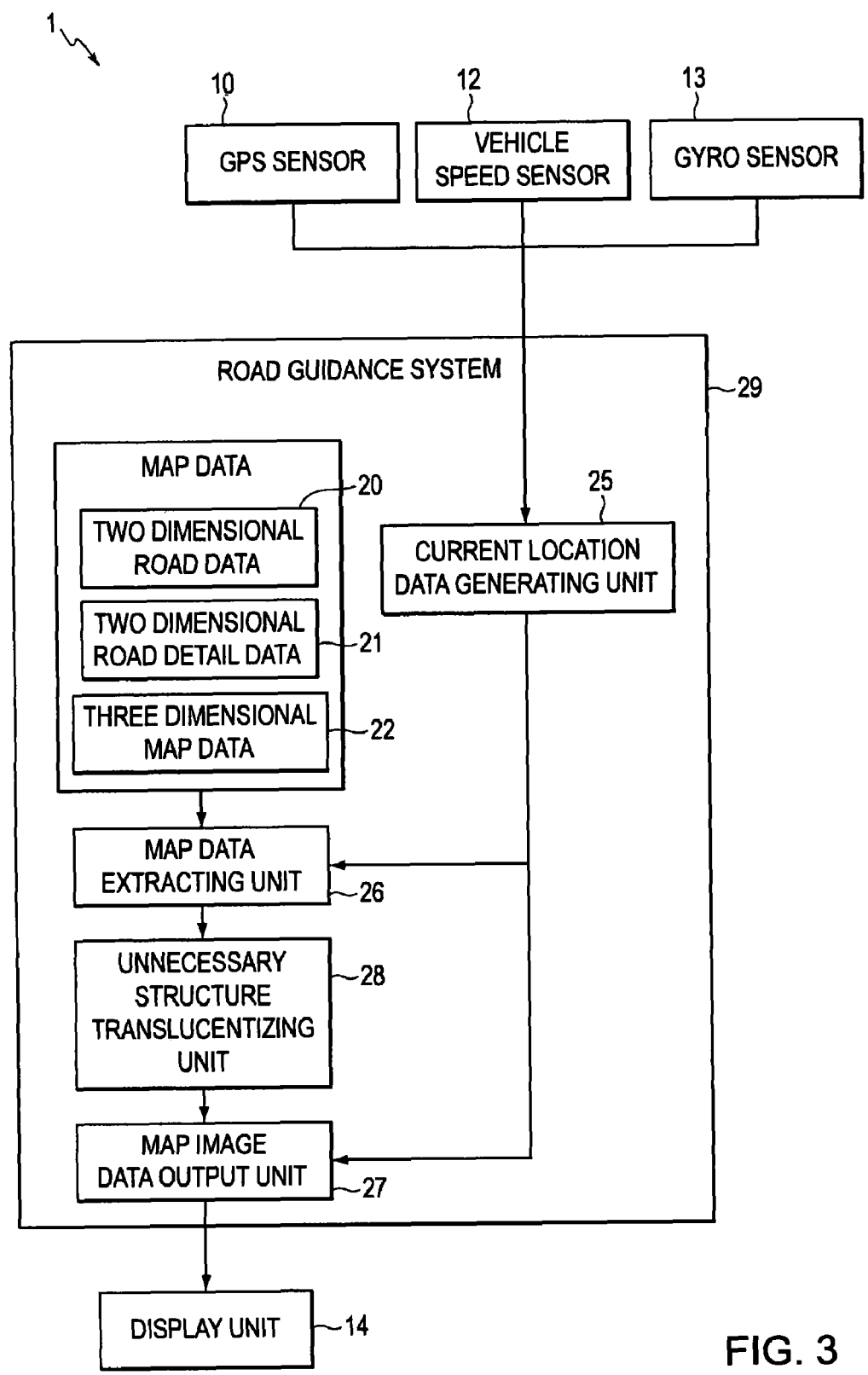
FIG. 3 is a diagram illustrating an exemplary road guidance system.

FIG. 3 is a diagram illustrating an example of the system configuration of a road guidance system. The road guidance system 29 may be formed when CPU 5 performs the route guidance program stored in the program storage unit 17. The current location data generating unit 25 may generate current location data of a vehicle on the basis of the GPS signal from GPS unit 10, detected speed from the vehicle speed sensor 12, the gyro 13 and so forth. The current location data may include information presenting the driving condition of vehicle such as latitude and longitude of the current location, the traveling direction, the speed, the acceleration, and/or so forth.

The map data extracting unit 26 may receive the current location data from the current location data generating unit 25 and may extracts map data from two-dimensional road detail data 21 and three-dimensional map data 22 to provide guidance at the current location. As described later, regarding three-dimensional map data 22, the map data extracting unit 26 may set a region for which data is to be read along the route and may extract structures located within the region for which data is to be read, from among the structures in three-dimensional map data 22.

The unnecessary structure translucentizing unit 28 may set a triangle region at the side of inner circumference of turns in case that the route may become blocked in the moving three-dimensional image due to buildings when a vehicle turns. The unnecessary structure translucentizing unit 28 may extracts the structures located in the triangle region out of the structures in three-dimensional map data 22, and sets predetermined translucent ratio to the extracted structures (e.g., 50%).

The map image data output unit 27 may generate map image data for guidance with two-dimensional road detail data and three-dimensional map data extracted by the map data extracting unit 26 and may output the image on the image display unit 14. The map image data output unit 27 may obtain current location data from the current location data generating unit 25 and may display the current driving location of the vehicle, the traveling direction, and so forth with a moving two-dimensional image and/or a moving three-dimensional image on the basis of this data.

Regarding the moving three-dimensional image, the map image data output unit 27 may set a viewpoint on the basis of the current location acquired by the current location data generating unit 25, and may calculate the two-dimensional image data which is for drawing the scene from this viewpoint in perspective by means of three-dimensional map data. Then the map image data output unit 27 may create two-dimensional image data in real time in accordance with the motion of the viewpoint. By displaying the series of the created data sequentially on the image display unit 14, a moving three-dimensional image may be displayed on the image display unit 14. Thus, the map image data output unit 27 may function as a moving three-dimensional image generator for generating a moving three-dimensional image viewed from predetermined viewpoint on the basis of three-dimensional map data 22.

Note that the terms "moving image" and "motion-image" described herein contemplate a picture shifts smoothly or still images which are displayed at predetermined intervals so that driver may recognize their consecutive relation. When displaying moving images, the smoother the motion-image displayed, the more processing ability or memory of CPU 5 is consumed. Therefore, presenting a moving image by using consecutive still images may decrease the load of the navigation apparatus 1. Each still images consecutively displayed may be a still image in which the viewpoint moves in accordance with the movement of current location. A relative position of viewpoint with respect to the traveling vehicle may be identical; however, the relative position may change in accordance with the movement of current location.

Figure 4:
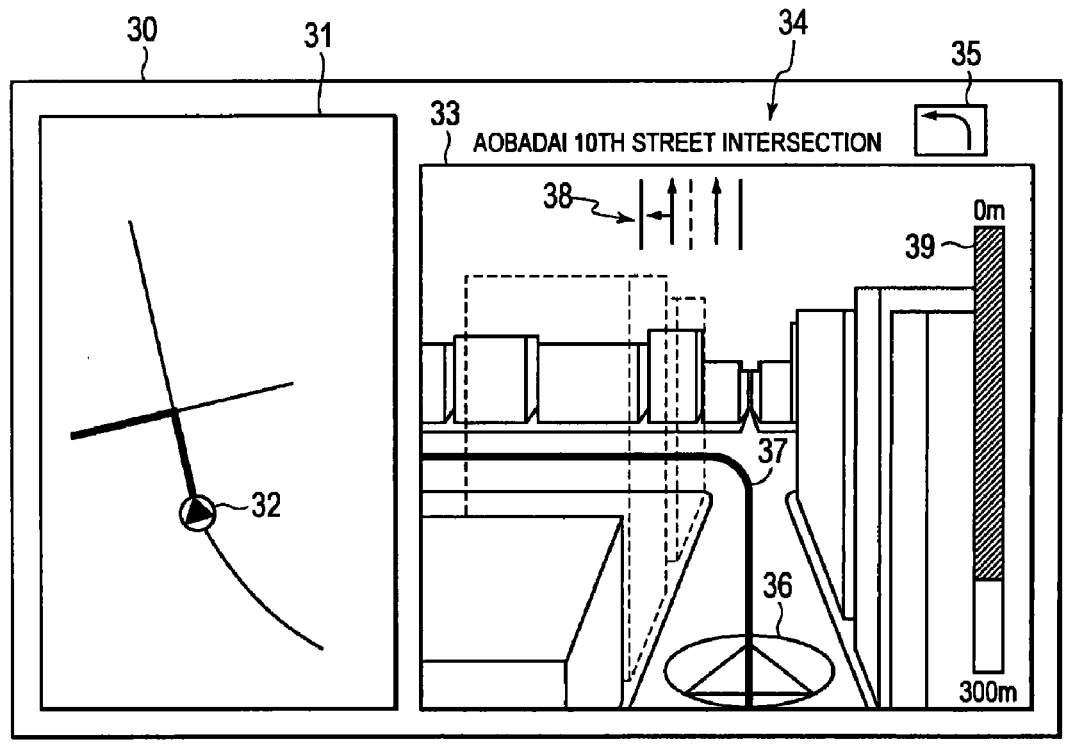
FIG. 4 is a diagram illustrating an exemplary guidance screen in the navigation apparatus.

FIG. 4 is a diagram illustrating an example of a guidance screen displayed on the image display unit 14. The guidance screen 30 may include a two-dimensional map screen 31 and a three-dimensional map screen 33. The two-dimensional map screen 31 may be drawn with two-dimensional road detail data 21, and the three-dimensional map screen 33 is drawn with three-dimensional map data 22. Note that the guidance screen may have various display modes. Therefore, it may be possible to display a two-dimensional map screen 31 on a full screen or the enlarged two-dimensional map at the position of the three-dimensional map screen 33.

On the two-dimensional map screen 31, the current location and the traveling direction of vehicle may be displayed as self-vehicle icon 32 on the two-dimensional map. On the three-dimensional map screen 33, the motion-image presenting a visible scene from a vehicle perspective may be displayed by three-dimensional computer graphics. The direction and/or location of viewpoint may be adjustable. For example, it may generally face the traveling direction of the vehicle. In addition, the viewpoint may be set above vehicle, and current position and traveling direction of vehicle may be displayed as self-vehicle icon 36.

On the three-dimensional map screen 33, a route 37 and/or traffic lane information 38 may be displayed. By following three-dimensional map screen 33, a driver may change a course or change a lane. In addition, on the three-dimensional map screen 33, a distance indicator 39 may be displayed indicating the remaining distance to the guidance intersection that gives guidance of a course change. The maximum distance to guidance intersection (300 m in FIG.) and the remaining distance to guidance intersection (corresponding to the length of the bar) may be displayed. Additionally, at the top of the three-dimensional map screen 33, the name of the intersection 34 and an arrow 35 representing a turning direction may be displayed.

The navigation apparatus 1 may normally display the two-dimensional map screen 31 on the full guidance screen 30. When vehicle approaches a guidance intersection, it may begin to display the three-dimensional map screen 33. The three-dimensional map screen 33 may keep being displayed until the vehicle passes through the guidance intersection. This moving three-dimensional image for route guidance may be called a cut-in movie.

Cut-in movie is one kind of enlarged images of intersection, and driver may arrange it to be displayed or not displayed. The cut-in movie may displayed while vehicle drives on general roads, and the conventional guidance with the two-dimensional map screen 31 may be provided when driving on expressways. The resolution of cut-in movie on the screen may be, for example, 512×480 dots (width×height) on VGA (Video Graphics Array).

With reference to FIGS. 5-9, an example of generating cut-in movie in navigation apparatus will be explained. This function may be performed by the map data extracting unit 26.

Figure 5:
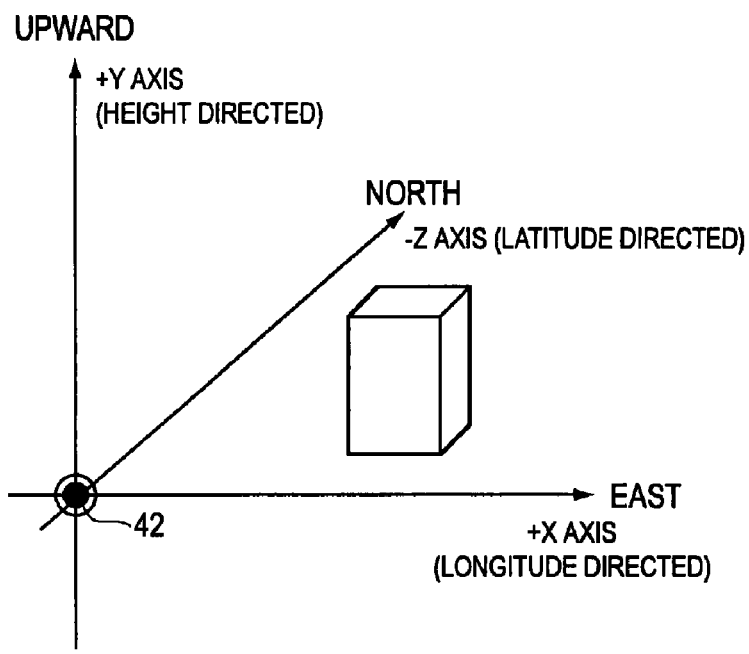
FIG. 5 is a diagram illustrating an exemplary coordinate system.

FIG. 5 is a diagram illustrating a coordinate system that may be used in the navigation apparatus 1. The navigation apparatus 1 may sets a drawing reference point 42 as origin of coordinate and sets a longitude direction along an X-axis in a positive and easterly direction. It may also set a latitude direction along a Z-axis in a negative and northerly direction and a height direction along a Y-axis in a positive and upward direction. The drawing reference point 42 is a reference point for the map data extracting unit 26 to set a region for which data is to be read, and it may be a specified point on the route. Thus, the navigation apparatus 1 may set a reference point at a specified point on route.

In particular, a point within an intersection on the route may be set as the specified point (drawing reference point). More specifically, a center point in an intersection, an intersection node, a closest complement point to an intersection node or a center point of intersection (in case of three-dimensional network data), a center point of a region where an entrance lane to an intersection and a departing lane from an intersection are crossing, and/or so forth. Further, when a specified point is set at any point but intersections on the route, for example, on a curve, a specified point (a drawing reference point) may be set at a center point of the curve, at a point with largest curvature, on a common node for two adjacent links on a curve which angle between the two links is the smallest, and so forth.

A method of setting a drawing reference point will be described with reference to FIG. 6. The navigation apparatus 1 may sets a drawing reference point in an intersection guidance area 44 of a guidance intersection. The guidance intersection described here is an intersection where guidance is given by cut-in movie, such as an intersection where guidance route makes a right or left turn, a complicated intersection such as three-road intersection or five-road intersection, and/or so forth. Guidance intersections may be determined along a route based on their qualities. For example, a condition that an intersection making turns or the like may be preset so that navigation apparatus 1 may detect the intersections fulfilling the search condition for guidance intersection. Alternatively, it may be possible to specify an attribute for each intersection to determine whether guidance should be given or not.

Generally, the navigation apparatus 1 sets a route on links 43 and sets a drawing reference point 47 on a node. A drawing reference point 47 may also be determined, for example, at a point other than a node, such as by setting a center point of an intersection guidance area 44 as the drawing reference point 47. When adjusting a view position in accordance with turns at a guidance intersection in order to provide better visibility of a route in a cut-in movie, the navigation apparatus 1 may use the drawing reference point 47 as a viewpoint adjusting reference point.

Note that a route may occasionally be determined by means of more detailed road map data (called three-dimensional network data) such as traffic lane data, and so forth. When a route is assigned on a node, it is set on the center of road, however, when using detail road map data, a route may be set on a specific traffic lane instead of the node. Detail road map data may provide complement points for drawing a leading curving line during the turn. In the case of assigning a route with these detail road map data, navigation apparatus 1 may determine a closest complement point to a node to serve as a drawing reference point. Further, navigation apparatus 1 may set a viewpoint adjusting reference point at a point where a route enters an intersection guidance area 44. An arrangement may also possible to display a guidance line on the left side of road by displaying a route on the left of the centerline of the road.

Figure 6:
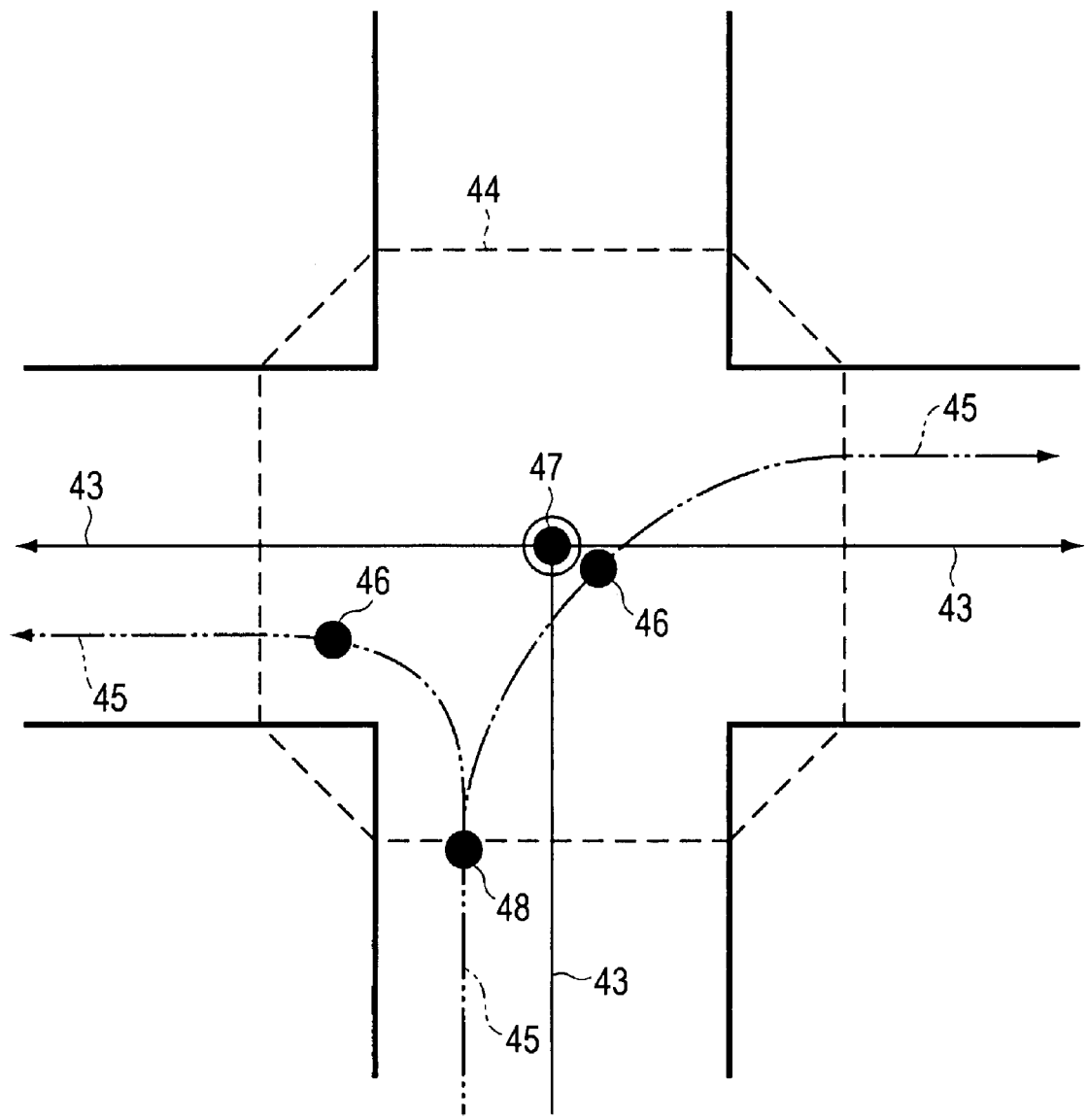
FIG. 6 is a diagram illustrating an exemplary method of setting drawing a reference point.

In the example of FIG. 6, one or more drawing reference points 46 may be set at complement points on the route 45. Note that in this diagram, a drawing reference point 46 is shown for two possible routes 45, one having a right-turn and one having a left-turn. The point where the route 45 enters the intersection guidance area 44 may be set as a viewpoint adjusting reference point 48. Note that, when a distance from a point entering intersection guidance area 44 to a drawing reference point 46 is greater than a predetermined distance (e.g., greater than 40 m), an arrangement may be made to set a point which is the intersection guidance area 44 and a predetermined distance away from a drawing reference point 46 as a viewpoint adjusting reference point.

Figure 7A:
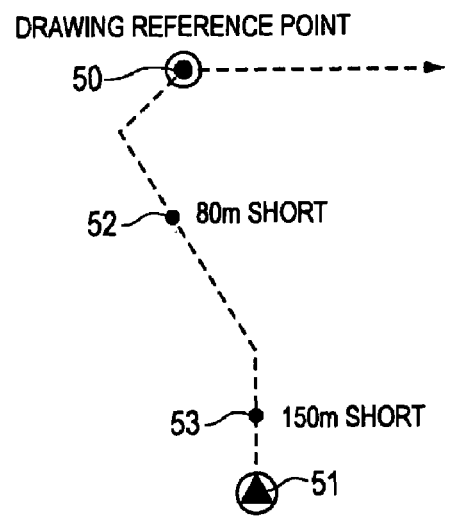
FIGS. 7A-7C are diagrams illustrating an exemplary method for setting a region for which data is to be read.

Next, a method of setting a region for which data is to be read will be described with reference to FIGS. 7A-7C. First, as shown in FIG. 7A, navigation apparatus 1 may set a first point 52 and a second point 53 before a drawing reference point 50 (also serving as an origin of coordinate) in front of a self-vehicle 51 on the route displayed with dotted line. The first point 52 may be a first distance (herein 80 m) away from a drawing reference point 50 along the route, and the second point 53 may be a point that is a second distance (herein 150 m) away from a drawing reference point 50 along route. The second distance is greater than the first distance. Note that first distance and second distance are set as the distance along route here; however, they may be alternatively set as straight line distance from the drawing reference point 50.

Alternatively, a first point and a second point can be respectively determined at a node located in a vicinity of the first distance and a node located in a vicinity of the second distance (e.g., a node which is shortest distance, or a note which is shortest distance from the first distance and the second distance in opposite direction from a drawing reference point) by means of two-dimensional road data 20. In this case, a node located about 80 m away from a drawing reference point 50 may be set as a first point, and a node located about 150 m away from a drawing reference point 50 may be set as a second point. If the route is curved at a node, a node which is adjacent the first point may be the second point.

As described below, navigation apparatus 1 may set a region for which data is to be read based on a straight line connecting a first point and a second point along the route. Therefore, navigation apparatus 1 may set a region for which data is to be read along route that is likely to be in the driver's field of view. Therefore, setting a region for which data is to be read in accordance with the shape of the route (e.g., points on the route) may reduce or avoid the reading of three-dimensional map data of a region that is outside the driver's field of view, and thus unnecessary.

As another alternative, for example, a first point may be set and the region for which data is to be read based on a line that passes through the first point and is alongside the link. Thus, navigation apparatus 1 includes point setting means for setting at least one point on the route.

Figure 7B:
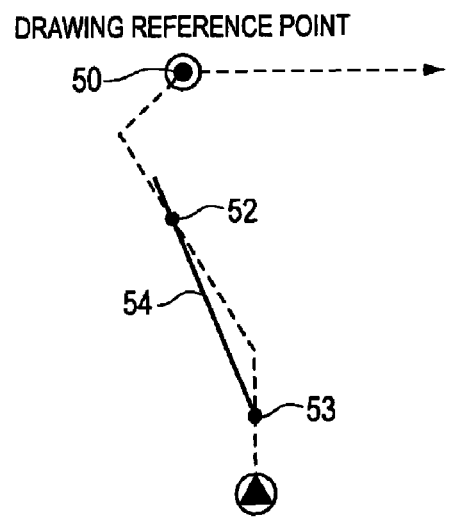

Next, as shown in FIG. 7B, the navigation apparatus 1 may set a line 54 having end-points that are the first point 52 and the second point 53. Then, navigation apparatus 1 may extend the side of first point 52 on line 54 up to a predetermined length (herein 10 m).

Figure 7C:
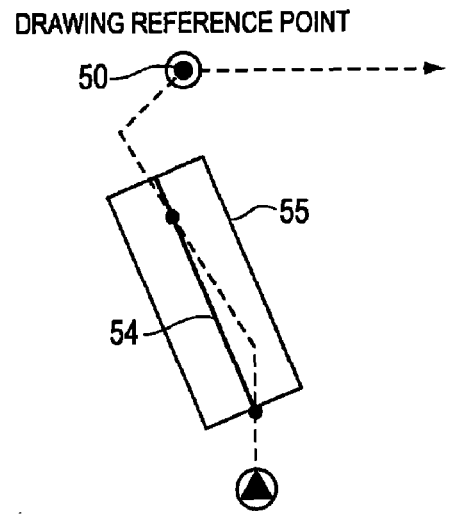

Next, as shown in FIG. 7C, navigation apparatus 1 may form a quadrangle 55 having the extended line 54 as a centerline and having a predetermined width (herein 30 m) on each left and right side from the centerline 54. This quadrangle 55 may be sets as a region for which data is to be read.

Returning to FIG. 7B, extending the centerline 54 predetermined length in traveling direction of vehicle is useful to avoid any missing parts in three-dimensional map data to read in, by overlapping a region for which data is to be read that will be formed ahead of this region for which data is to be read (not shown) with the region for which data is to be read 55. By setting a region for which data is to be read as described, three-dimensional map data may be extracted along route without any missing parts.

Thus, navigation apparatus 1 may set a region along the route based on points (first point and second point) as specified above. This region may be set as a rectangle (herein oblong) formed with this first and second point, and the straight centerline passing through this first and second point. Further, the edge of the rectangle at the side of the first point (furthest in traveling direction of the vehicle) may be extended a predetermined distance away from the first point by extending the centerline in the traveling direction of vehicle.

Figure 8:
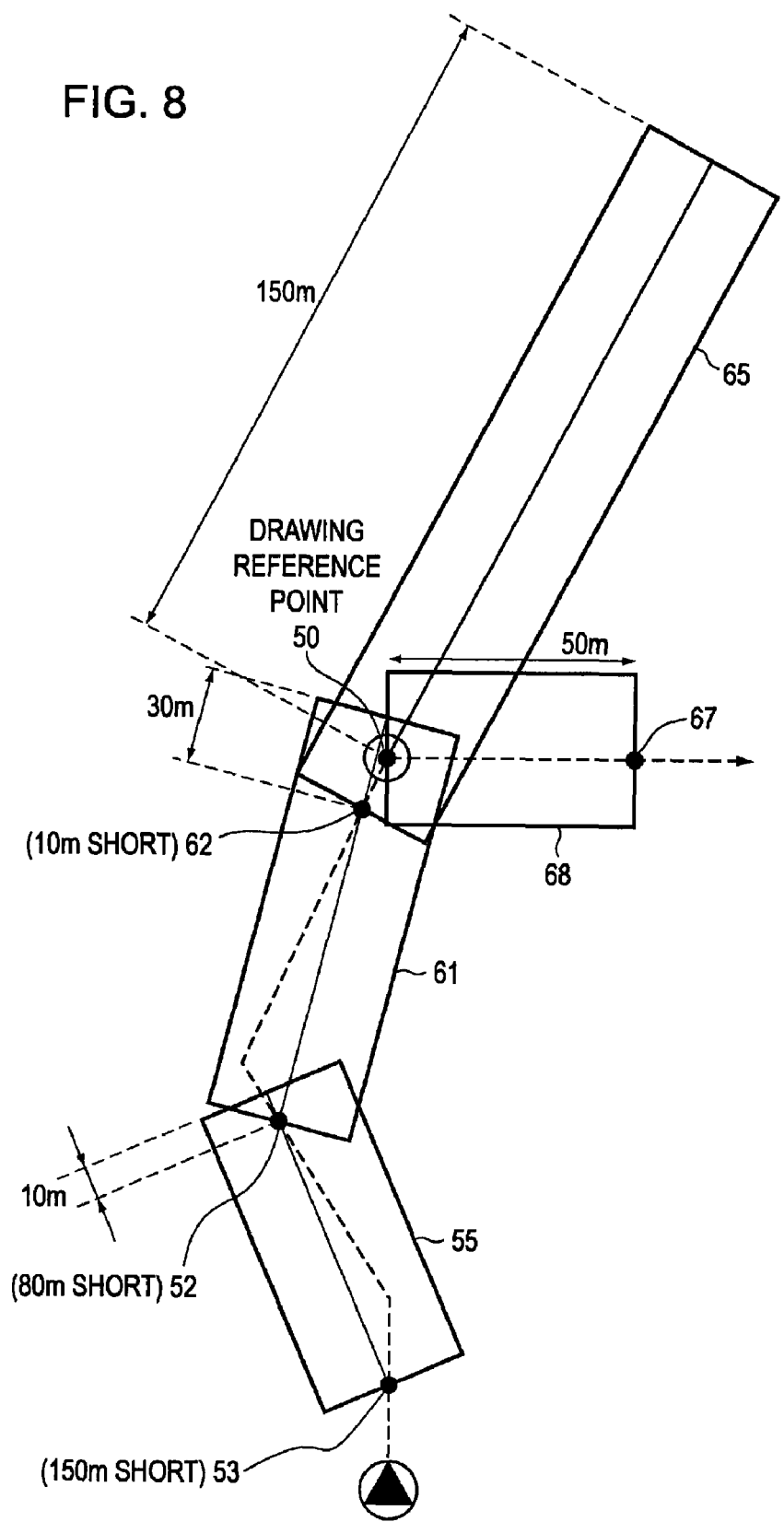
FIG. 8 is a diagram illustrating an example of regions for which data is to be read.

FIG. 8 is a diagram of an exemplary region for which data is to be read that navigation apparatus 1 may sets for a guidance intersection. In order to obtain as similar shape of a region for which data is to be read as the shape of route possible, the navigation apparatus 1 may set a total of four regions for which data is to be read including regions 61, 65, 68, in addition to 55, described above.

In order to set the region 61 for which data is to be read, navigation apparatus 1 may set a first point 62 at 10 m short of a drawing reference point 50 along route and may use point 52 as a second point. The navigation apparatus 1 may form a rectangle which has 30 m on each left/right side, and may sets this rectangle as the region 61 for which data is to be read. The edge of the region 61 may be located at 30 m extended point of centerline from the first point 62 in the traveling direction.

The reason for increasing the extension of centerline of the region 61 more than the region 55 is that the edge of the region 61 in the traveling direction is located nearby a guidance intersection. Because the traveling direction of vehicle will likely shift in a guidance intersection, the increased overlaps of region 61 with regions 65 and 67 can prevent any interruption or lack of three-dimensional map data in a guidance intersection in the cut-in movie. That is to say, in order to read in three-dimensional map data of the area displayed on a guidance screen even in a guidance intersection with significant level of turn, an arrangement is made to set a region for which data is to be read relatively large.

The region 65 may be a rectangular region based on a centerline which passes through the drawing reference point 50 serving as a first point and the point 62 serving as a second point, and which has 30 m on each left/right side. The centerline may be extended 150 m from the drawing reference point 50. Because when entering an intersection, the scene directly ahead of the vehicle will be in good view, navigation apparatus 1 sets a relatively large region for which data is to be read in a direction extending in the viewing direction. Thus, when a first point is located in an intersection, the navigation apparatus 1 may set greater predetermined distance (length of extension) to extend the edge of the region on the side of a first point, than other regions.

Regarding region 68, the navigation apparatus 1 may set the drawing reference point 50 as a first point, set a point 67, which is 50 m away from the drawing reference point 50 along the route as a second point, and set a rectangular region with a centerline passing through a first point and a second point as the region 68. The left/right width from a centerline may be 30 m each. The navigation apparatus 1 may quits cut-in movie after a vehicle completes a turn at a guidance intersection. Therefore, it may not be necessary to extend the center line of the region 68, which is for drawing a scene after turning. Thus, without unnecessary extension of centerline of the region 68, the amount three-dimensional map data that must be read is decreased, and consequently the amount of memory consumption may be reduced.

Next, a method of determining structure within a region for which data is to be read will be described with reference to FIG. 9. The structures that are determined to be located within a region for which data is to be read may be extracted from three-dimensional data 22. Navigation apparatus 1 (e.g., via map data extracting unit 26) may forms a rectangle (e.g., 72, 73, 74) with vertexes of a smallest and a biggest X coordinate and Z coordinate of the structure on the X-Z plane. If at least a part of this rectangle is located within a region for which data is to be read (e.g., region 71), navigation apparatus 1 determines the structure is located within the region for which data is to be read. If the region of the rectangle is not at all located within the region for which data is to be read, it may be determined that the structure is not located within the region for which data is to be read.

Figure 9:
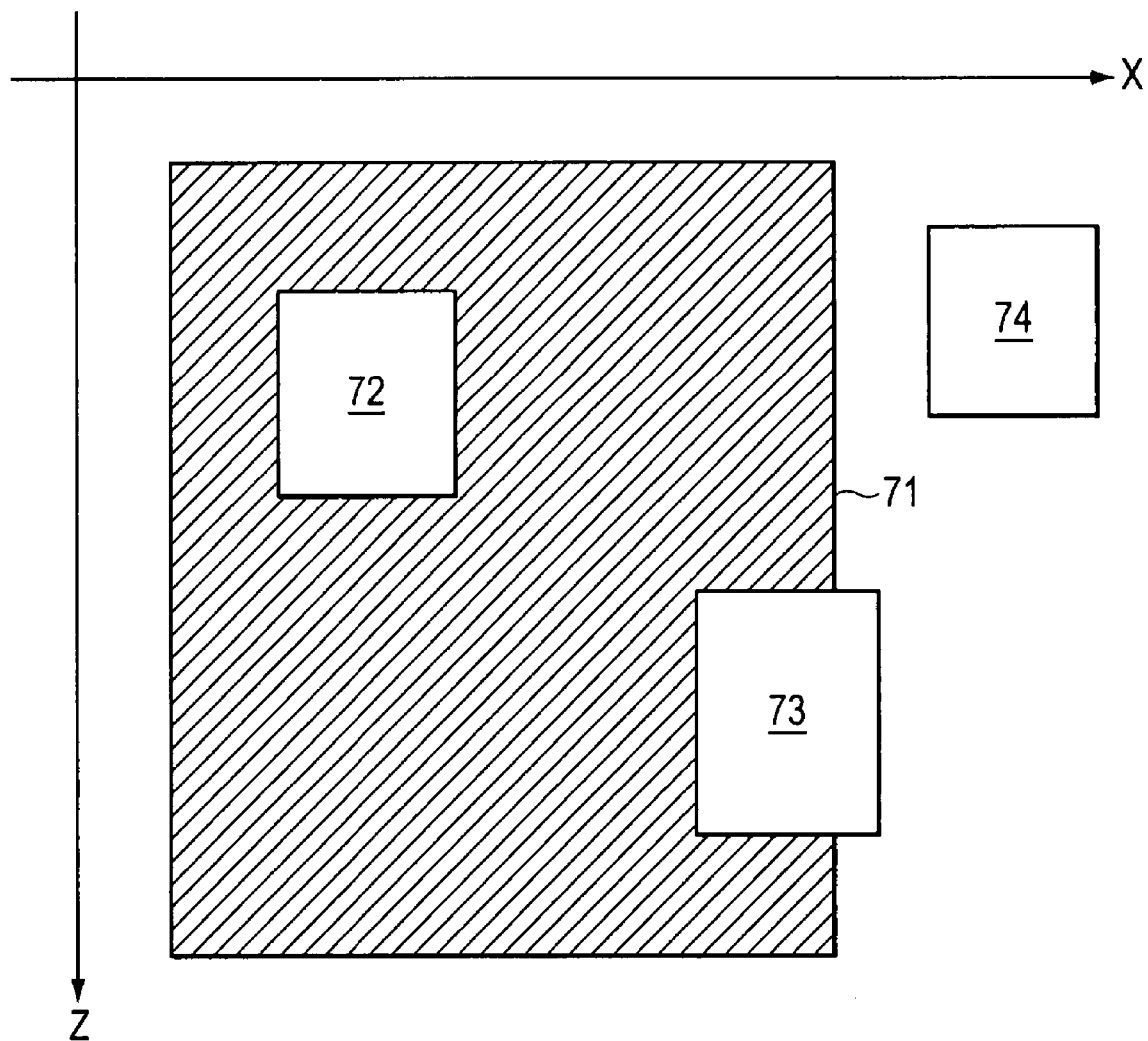
FIG. 9 is a diagram illustrating an exemplary method of determining structures within the region for which data is to be read.

According to the specific example shown in FIG. 9, a rectangle 72 is entirely located within a region 71 for which data is to be read. Also, a rectangle 73 is partially located within region 71. Therefore, the structures corresponding to rectangles 72 and 73 may become a subject for extraction. On the other hand, a rectangle 74 is not at all located within region 71 at all. Therefore, the structure(s) corresponding to the rectangle 74 may not become a subject for extraction. The navigation apparatus 1 may thus determine whether structures which may be displayed with three-dimensional map data are located within a region for which data is to be read, and if they are located in a region for which data is to be read, the three-dimensional map data may be read out.

In addition to the above described methods, other conditions may be used to reduce the amount of memory consumption by further eliminating three-dimensional map data to be read. For example, regarding structures whose element classification is other than road, it may be possible to avoid reading three-dimensional data for small structures, which may not be important for recognizing an area. For example, structures that fit within a sphere having diameter of a predetermined length (100 m, for example) and at least a part of the sphere is located within the region for which data is to be read, the structures fitting within the sphere may not be read. Thus, the amount of memory consumption may be decreased. "Element classification" here refers to a classification of structure such as road, railroad, building, and so forth, and it may be associated with given to structures as an attribute. Thus, it may also be possible to reduce the three-dimensional data read for the cut-in movie by not reading data for structures having one or more specified element classifications.

Next, with reference to a flowchart in FIG. 10, an exemplary road guidance method will be described. The method may be implemented, for example, by CPU 5 executing a road guidance program.

Figure 10:
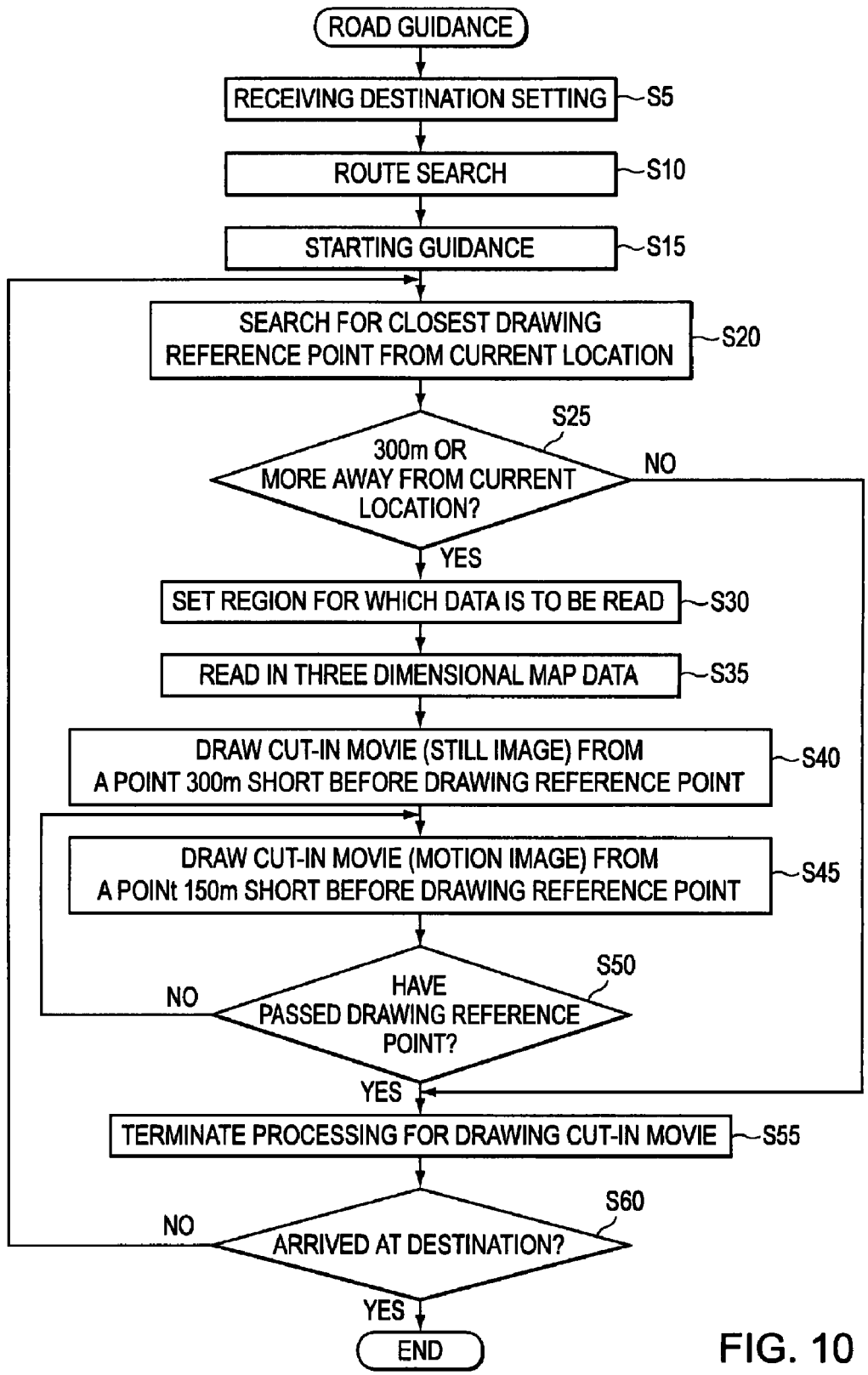
FIG. 10 is a flowchart illustrating an exemplary method of providing route guidance.

As shown in FIG. 10, first, navigation apparatus 1 receives a destination setting, e.g., input by a driver (Step 5). Next, the navigation apparatus 1 performs a route search to the destination by means of two-dimensional road data 20 (Step 10), and starts providing guidance on a guidance screen (Step 15).

Then, navigation apparatus 1 sets a drawing reference point on, for example, a node in a guidance intersection on the route. All the drawing reference points over the entire route may be set in advance, or a predetermined number of drawing reference points which are closest to a current location may be set and other drawing reference points may be set sequentially in accordance with the modem of the vehicle.

Next, the navigation apparatus 1 searches for a closest drawing reference point from current location (Step 20), and determines whether this drawing reference point is 300 m or more away from the current location (Step 25), e.g., to ensure there is enough time for generating and displaying a cut-in movie. The distance may be longer or shorter than 300 m, according to, for example, the information processing capability of the navigation apparatus 1 and the speed of vehicle.

In the case that the distance from current location to a drawing reference point is less than 300 m (Step 25=No), the navigation apparatus 1 terminates drawing processing of cut-in movie relating to this drawing reference point (Step 55). In this case, navigation apparatus 1 may display a two-dimensional enlarged image of guidance intersection instead of cut-in movie.

If the distance from current location to a drawing reference point is more than 300 m (Step 25=Yes), the navigation apparatus 1 defines a region for which data is to be read based on this drawing reference point (Step 30). Navigation apparatus 1 then reads in the structures in the region for which data is to be read (set in Step 30) among all the structures in three-dimensional map data (Step 35).

Next, when the current location of vehicle reaches a point of 300 m away from a drawing reference point, the navigation apparatus 1 generates a still image as part of the three-dimensional motion-image of the viewpoint located 150 m before a drawing reference point, and displays it as a cut-in movie (Step 40). This is still image may notify a driver that a cut-in movie will be displayed, and in a mean time, for performing a process of displaying three-dimensional motion-image while the sill picture is displayed. Then when current location of vehicle reaches the point of 150 m away from a drawing reference point, navigation apparatus 1 switches the still image to the motion-image, and displays a moving three-dimensional image in real time (Step 45).

Next, navigation apparatus 1 judges whether current location has passed a drawing reference point (Step 50), and in the case of not having passed through (Step 50=No), it continues drawing cut-in movie. When having passed the drawing reference point (Step 50=Yes), navigation apparatus 1 may terminate drawing cut-in movie (Step 55). However, for example, the cut-in movie may also be terminated when the vehicle goes off the route or when the vehicle has traveled predetermined distance beyond the drawing reference point along the route.

Then, navigation apparatus 1 judges whether current location has reached a destination (Step 60). If the destination is not reached (Step 60=No), operation of the method returns to Step 20 and performs a drawing processing of cut-in movie for next drawing reference point. If the current location has reached the destination (Step 60=Yes), navigation apparatus 1 terminates road guidance. Thus, in the present example 1, by setting region for which data is to be read limitedly along the route, the amount of three-dimensional map data read in for example, RAM 7 (FIG. 2) may be reduced, and consequently, this may decrease the memory consumption.

In the examples above, the navigation apparatus 1 may sequentially set regions for which data is to be read in accordance with the traveling of vehicle. However, the regions for which data is to be read throughout the route may be set and stored at the start of driving, and read them out in accordance with traveling. Because regions for which data is to be read are set beforehand, when guidance starts, more of the resources of CPU 5 may be dedicated displaying cut-in movies during traveling. A procedure of this case will be described with reference to a flowchart in FIG. 11. Note that the same processing as FIG. 10 will be given with the same reference numeral, and the description will be simplified.

Figure 11:
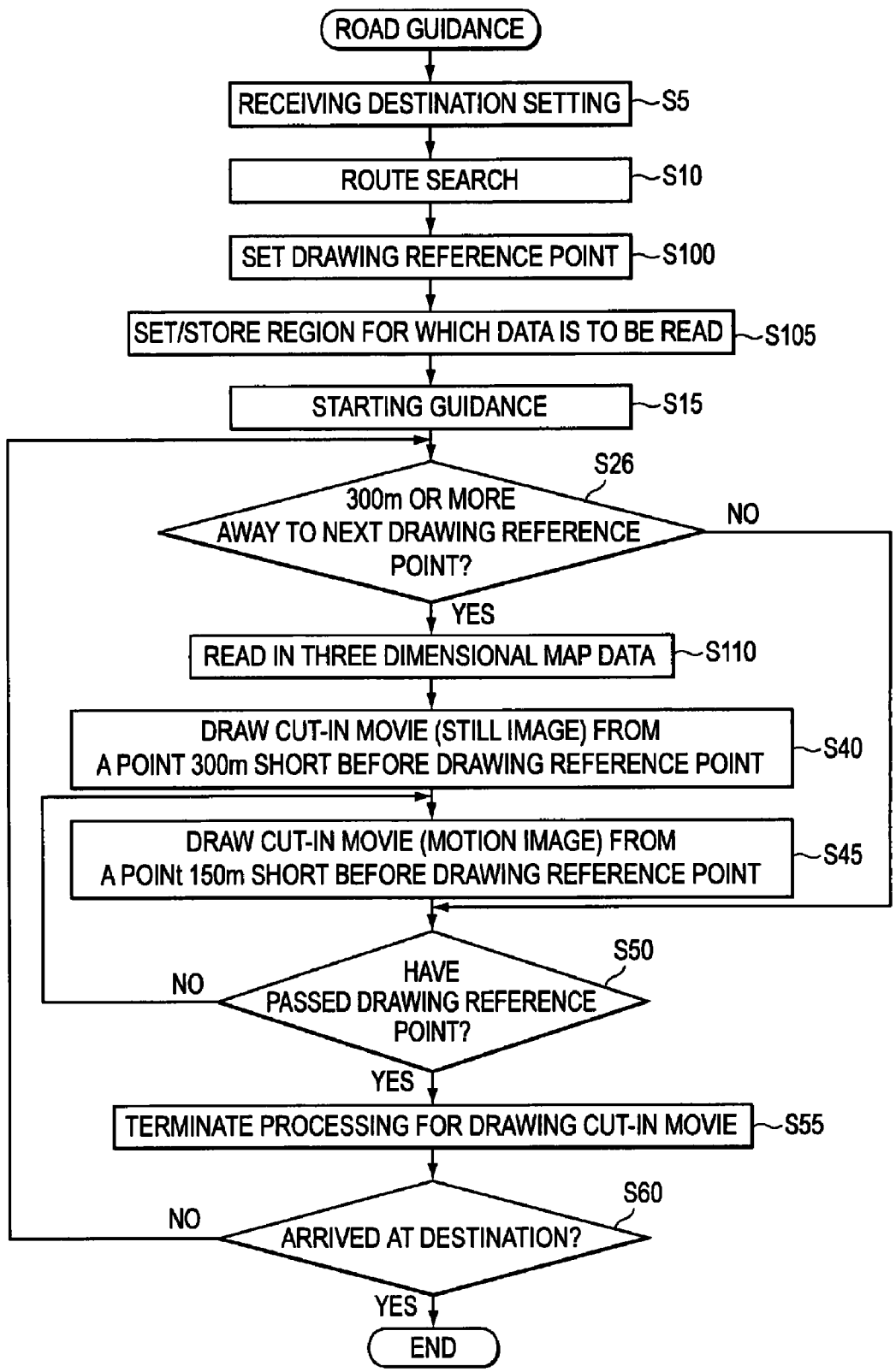
FIG. 11 is a flowchart illustrating an exemplary method of providing route guidance.

As shown in FIG. 11, first, navigation apparatus 1 receives a destination setting, e.g., input by a driver (Step 5), and performs a route search for destination (Step 10). Next, navigation apparatus 1 sets all the drawing reference points throughout the route (Step 100). Then, navigation apparatus 1 sets the region for which data is to be read for each preset drawing reference point, and stores them in a memory such as RAM 7 (FIG. 2) or the like (Step 105). Then, navigation apparatus 1 starts providing guidance on the guidance screen (Step 15).

Next, navigation apparatus 1 determines whether the next drawing reference point (the first reference point if immediate after the departure) is more than 300 m away from current location (Step 26). In the event that the distance to next drawing reference point is less than 300 m (Step 26=No), navigation apparatus 1 terminates the drawing process of cut-in movie for this drawing reference point (Step 55). In the event that the distance to next drawing reference point is more than 300 m (Step 26=Yes), navigation apparatus 1 reads out the region for which data is to be read corresponding to this drawing reference point stored in memory, and reads in the three-dimensional map data in this region for which data is to be read among the three-dimensional map data 22 (Step 110). The rest of the process may be the same as the process in the flowchart in FIG. 10.

A guidance procedure with cut-in movie has been described above, but it is possible to give more detailed conditions for display of cut-in movie. For example, in the case that the distance to an adjacent guidance intersection is more than 150 m and less than 300 m, an arrangement may be made for navigation apparatus 1 to display the guidance image of the next guidance intersection immediately after passing the first guidance intersection. In this case, when navigation apparatus 1 successfully draws the cut-in movie at the first intersection, it may provide guidance with two-dimensional enlarged image at the next guidance intersection. When it does not draw cut-in movie at the first guidance intersection, it provides guidance with cut-in movie at the next guidance intersection.

If the distance to an adjacent guidance intersections is less than 150 m, the navigation apparatus 1 may provides guidance with a two-dimensional enlarged image at the next intersection, despite the fact that the guidance provided at the first guidance intersection was with cut-in movie or two-dimensional enlarged image. Additionally, at rotaries (also called roundabout intersections) or side roads, the navigation apparatus 1 may provide guidance in the same way as a conventional navigation apparatus.

Various conditions for drawing cut-in movie have been explained above. However, these are for providing as much guidance with cut-in movie as possible within the limits of an information processing capability of navigation apparatus 1. In case that information processing capability of navigation apparatus 1 is sufficient, guidance with cut-in movie may be performed at every guidance intersection, despite of the distance between current location and drawing reference point.

Hereinafter, advantages that may be obtained according to one or more of the above described examples will be described.

The above described setting of a region for which data is to be read along the route may decrease the amount of the three-dimensional map data to read in the memory. The above described setting of a region for which data is to be read along the route may make it is possible to determine whether any structure is located within a region for which data is to be read and to prevent reading in unnecessary structure.

According to one or more of the above examples, it is possible to determine whether to draw a cut-in movie on the basis of the distance between current location and drawing reference point, so that the cut-in movie may be drawn within information processing capability of CPU 5.

Figure 12A:
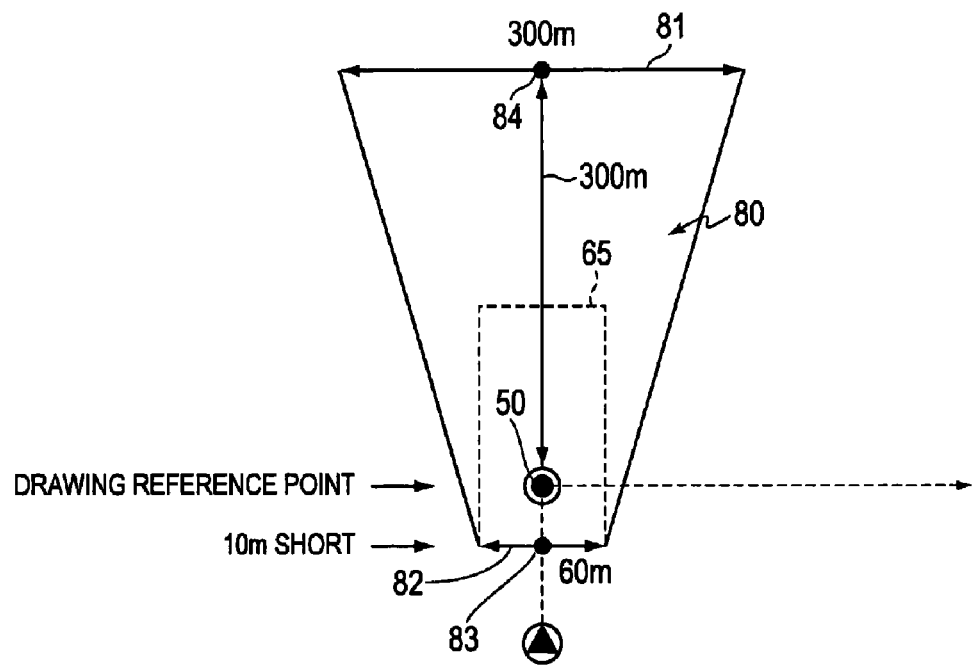
FIGS. 12A-12B are diagrams illustrating an exemplary region for which data is to be read at an intersection.
Figure 12B:
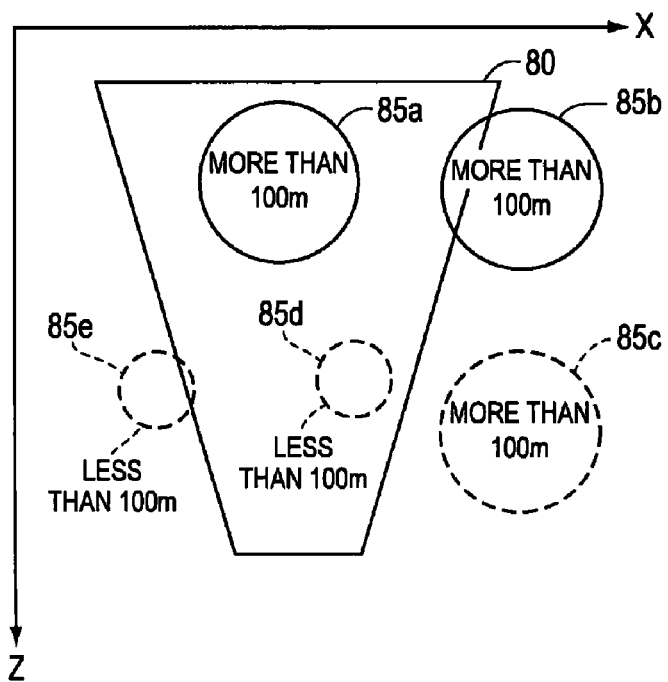

FIGS. 12A-12B are diagrams illustrating an exemplary region for which data is to be read at an intersection. In particular, FIGS. 12A-12B illustrate a method for setting a region for which data is to be read behind a guidance intersection. In previous examples, a region for which data is to be read was set behind an intersection by region 65 (FIG. 8). However, a region for which data is to be read may be set in trapezoidal shape whose width widens as it behind an intersection, and more faithful three-dimensional motion-image corresponding actual scenery will be drawn.

As sown in FIG. 12A a drawing reference point 50 may be set in a guidance intersection. The route turns to the right at the guidance intersection as shown with dotted line. Navigation apparatus 1 may connect the drawing reference point 50 and the point 83 located 10 m before the drawing reference point with a straight line and may allocate the point 84 by extending this straight line 300 m away from the intersection.

Navigation apparatus 1 may set a region 80 for which data is to be read in a trapezoidal shape based on the points 83 and 84, which has 30 m right/left each (total 60 m) on the front side, and 150 m each (total 300 m) on the rear side. Thus, navigation apparatus 1 may extract three-dimensional map data 22 in the set region 80, generates three-dimensional motion-image, and displays it on the guidance screen.

Note that the region 80 may be set from the drawing reference point 50 in entrance direction. However, the region 80 may be set from a point 83 that is 10 m before the drawing reference point 50, in order to overlap other regions for which data is to be read at the intersection.

The region 80 may be a trapezoid whose side away from the direction in which the vehicle approaches is widened, corresponding to the depth of view. That is to say, the region 80 may be a trapezoid in which the far side (the side beyond the intersection) is longer than the closer side (the front side) to the vehicle position before entering intersection. Therefore, in the set region, the width of far side is longer than the width of closer side to the vehicle position. The determination whether the structure presented on the basis of three-dimensional map data 22 is located within the region for which data is to be read 80 may be performed by the method explained in FIG. 9.

When only important and big structures for drivers' view are extracted from three-dimensional map data 22, the amount of memory consumption may be decreased. An example of a method of extracting structures will be explained as below. Navigation apparatus 1 may form a quadrangular prism whose base is the region for which data is to be read 80 with infinite height. FIG. 12A denotes such a quadrangular prism viewed from the height position.

Regarding the structures whose element classification is other than road, navigation apparatus 1 may forms a smallest sphere surrounding the entire structure for each structure. For each sphere in which the diameter is less than predetermined value (100 m, for example) the surrounded structure may be excluded from extraction. Regarding the structures whose sphere's diameter is more than predetermined value (100 m, for example), the navigation apparatus 1 may extracts the structures in which at least a part of the sphere is included within the quadrangular prism from three-dimensional map data 22 as three-dimensional map data for region 80.

In the example of FIG. 12B, the diameter of sphere 85a and 85b is more than 100 m. Further, at least a part of X-Z coordinate figure of the space created by the sphere is inside the region for which data is to be read 80, accordingly at least a part of sphere 85a and 85b is located within the quadrangular prism. Thus, the structures within the sphere 85a and 85b are extracted from three-dimensional map data 22. The diameter of sphere 85c is more than 100 m but it is not at all located within the quadrangular prism, accordingly it does not become an extracting object. Also, as the sphere 85d is located inside the quadrangular prism but the diameter is less than 100 m. Thus sphere 85*d* does not become an extracting object. Furthermore, as a part of sphere 85*e* is located inside quadrangular prism but the diameter is less than 100 m. Thus, sphere 85*e* does not become an extracting object.

The structures located within the region 80 may also be extracted by the method of FIG. 9 and then refine the extracted structures according to their diameter of the sphere. Further, it may possible to combine the extracting conditions of various ones of the above examples and the present example.

Specifically, the regions 61, 65, and 68 for which data is to be read shown in FIG. 8 may overlap the region 80 shown in FIG. 12A (region 65 is shown with dotted line, and the regions 61 and 68 are not illustrated). For the overlapped area with the region 61, 65, 68 in the region 80, the structures located within this overlapped area may be extracted by the method described in FIG. 9. For not-overlapped area, the structures whose sphere's diameter is more than 100 m and at least a part of it is located within the quadrangular prism whose base is the region 80 with infinite height will be extracted.

The region for which data is to be read 80 is larger than the region for which data is to be read 65 and so forth. Therefore, for the overlapped area with the region for which data is to be read 80, more structures are extracted by the method of FIG. 9 because it is located ahead of the vehicle and also close to the route. For not-overlapped areas, the large structures are selected and extracted on the basis of predetermined value. Therefore, a more accurate cut-in movie to the actual scene may be drawn while amount of the memory consumption may be saved.

In addition, the following arrangement may be possible. When a vehicle approaches to a drawing reference point, the predetermined value for extracting structures may become small. When a vehicle approaches to a drawing reference point, smaller structures seem to look bigger, and with such an adjustable value, navigation apparatus 1 can display three-dimensional motion-image with more accurate scene.

As described above, the navigation apparatus 1 may generate a region for which data is to be read for reading in three-dimensional map data 22 corresponding to the back of guidance intersection based on the route information at the guidance intersection, and make judgment whether the structures are located within this region for which data is to be read. Also, the structures at the back of the intersection may be drawn in perspective and with the omission of small structures. Therefore the sizes of the structures in the region for which data is to be read are determined with the use of a sphere. Thus, the relevant structures may be read in and navigation apparatus 1 generates the three-dimensional motion-image that is similar to the actual scene. With three-dimensional motion-image similar to the actual scene, driver may correspond with the three-dimensional motion-image and the scene around the vehicle and accordingly it makes easy to recognize the location of vehicle.

Figure 13A:
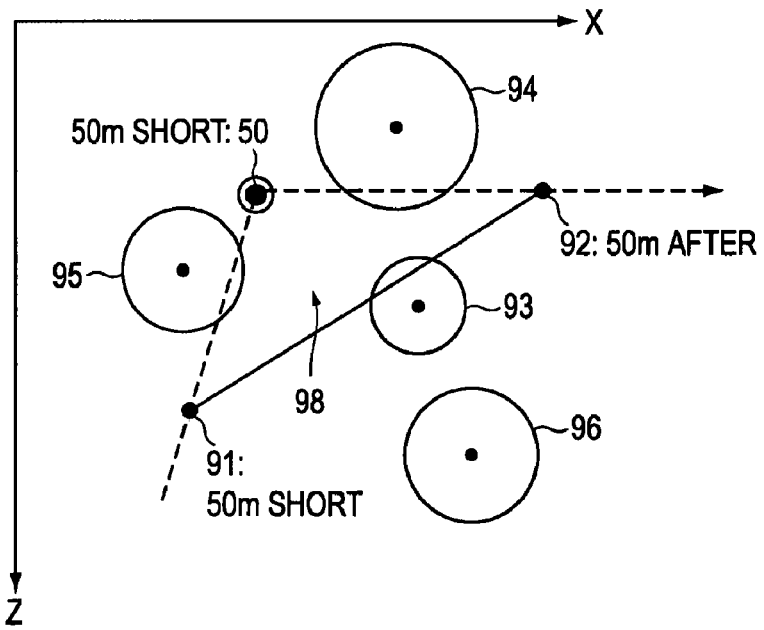
FIGS. 13A-13C are diagrams illustrating an exemplary method of displaying structures translucently.
Figure 13B:
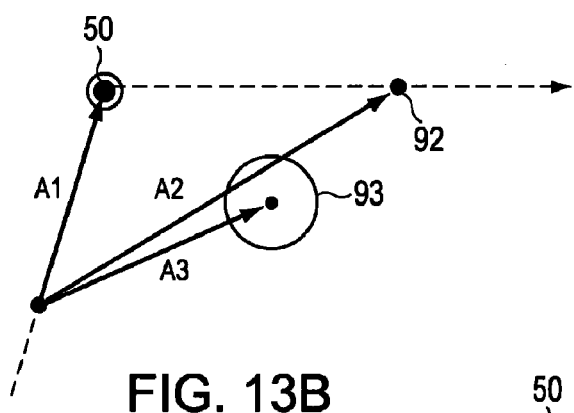
Figure 13C:
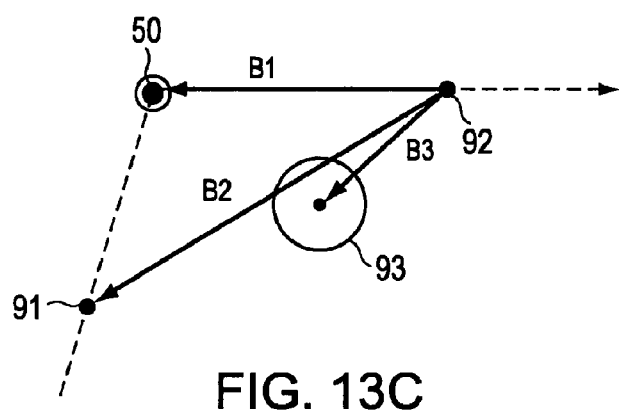

FIGS. 13A-C shows an exemplary method of visualizing the route by making structures that obscure the route translucent. Note that this route visualization method with translucence is applicable to each of the previous examples. As shown in FIG. 13A, navigation apparatus 1, may form a triangle region 98 by connecting the point 91 which is predetermined distance (50 m, for example) away from the drawing reference point 50 and the point 92 which is predetermined distance (50 m, for example) away from the drawing reference point 50 after turning. Subsequently it may perform the translucent processing for the structures in the triangle region 98 with predetermined translucent ratio (50%). Note that as far as the set region includes the triangle region 98, any larger area than that may be set.

Thus, navigation apparatus 1, despite of the positional relationship of viewpoint, route, and structures, may perform the translucent processing uniformly for the structures in the triangle region 98 in three-dimensional map data 22. For this reason, navigation apparatus 1 has no need to calculate or make a judgment to determine whether the route becomes a blind area based on the positional relationship of viewpoint, route, and structures. Accordingly the load of navigation apparatus 1 may be decreased.

As described above, navigation apparatus 1 may set a first reference point (the drawing reference point 50) at a specified point such as an intersection or a curve and so forth where the route may become obscured, may set a second reference point (the point 91) on the route where a vehicle enters the specified point, and may set a third reference point (the point 92) on the route from the specified point. Subsequently, the navigation apparatus may set a region including the triangle (the triangle region 98) whose vertexes are the first reference point, the second reference point, and the third reference point.

Furthermore, navigation apparatus 1 may obtain three-dimensional map data 22 as three-dimensional map data around the specified point, and may set a predetermined translucent ratio to the structures located within the set region among the obtained three-dimensional map data. The navigation apparatus may then generate three-dimensional motion-image that displays the route overlapped with the structures with the predetermined translucent ratio.

Navigation apparatus 1 may determine whether a structure is located within the triangle region 98 as described below. First, navigation apparatus 1 may set a circle having the center of the structure as its center point of the circle and the greatest distance to its vertex. The navigation apparatus 1 may extracts a structure when at least a part of the structure's circle is located within the triangle region 98 and it has a predetermined element type (for example, the ones that may block the route, such as, building, pedestrian overpass, bridge pier, overhead roadway, tree, and so forth). Note that it is also possible to set an inscribed circle involving the entire structure and define the center as the center of the building.

As shown in FIG. 13A, the navigation apparatus 1 may extract the structures (having element types that may be extracted) associated with the circles 93, 94, and 95 as at least a part of each circle 93, 94, and 95 is located within the triangle region 98, and may not extract the structure involved by the circle 96. Thus, at the first step, circles 93, 94, and 95 are extracted. However, only the structure associated with circle 93 needs to be refined because the structures involved by circle 95 and 94 are on the outer circumferential side of the turn of the vehicle. Note that the reason of defining the area of the structure in the form of circle is that, for example, there are such structures that are located outside of the triangle region 98 but practically block the view. By using circles, these structures may be the object for the translucent processing.

The navigation apparatus 1 distinguishes the structures located at the outer circumference of the turn and the structures located at the inner circumference of the turn by means of, for example, vector product, and narrows down the structures located at the side of inner circumference. As shown in FIG. 13B, navigation apparatus 1, may set a vector A1 which has the point 91 serving as the origin and the drawing reference point 50 as the end-point, a vector A2 which has the point 91 as the origin and the point 92 after the turn as the end-point, and a vector A3 which has the point 91 as the origin and the center of the circle (the circle 93 in the FIG. 13B) as the end-point. Subsequently, navigation apparatus 1 may determine whether A1×A2 and A1×A3 are the same directed vector. Note that the symbol "×" presents vector product, and A1×A2 is the vector quantity for turning direction of right-screw (the direction from the surface through the other side of the paper in FIG. 13B) when the screw turns from A1 to A2. In the case that the structure involved by the circle is located at the side of inner circumference of the turn for the entrance route to the drawing reference point 50, these vector products are both the vectors in the same direction.

Next, as shown in FIG. 13C, navigation apparatus 1 may set a vector B1 that has the point 92 after the turn as the origin and the drawing reference point 50 as the end-point, a vector 2 that has the point 92 after the turn as the origin and the point 91 as the end-point, and a vector 3 that has the point 92 after the turn as the origin and the center of the circle (circle 93 in FIG.) as the end-point. Then, navigation apparatus 1 may determine whether B1×B2 and B1×B3 are the same directed vector. In the case that the structure associated with the circle is located at the inner circumference of the turn for the exiting route from the drawing reference point 50, both of these vector products will be the same directed vector.

Navigation apparatus 1 calculates the vector product of the vector A1, A2, A3, B1, B2, and B3 for each circle as explained above and determines that the circles that A1×2 and A1×A3 are the same directed vector and also B1×B2 and B1×B3 are the same directed vector are on the inner circumference of the turn. In the example of FIG. 13A, the circles 94 and 95 are excluded and the circle 93 is selected. Thus, navigation apparatus 1 extracts the structures from three-dimensional map data 22 through the first stage and the second stage of the extract processing, and performs the translucent-processing for the structures determined to be on the inner circumference of the turn.

Structures may also be extracted by other means. For example, for the triangle region 98, the example explained in FIG. 9 may be applied to extract the structures located within the triangle region 98, or the means explained in FIG. 12B may be applied to form the triangle prism which has the triangle region 98 as the base with infinite height and then extract structures which at least a part of the sphere involving the structure is located in the triangle prism. In addition to displaying the structures translucently, other displaying modes, for example, displaying with line drawing may be used.

As described above, without performing the process on the basis of the positional relation of vehicle, route, and structures that constantly changes, navigation apparatus 1 may transform the display mode of the structures located in front of the route by the means of the translucent processing and so forth when the vehicle makes turn.

It should be appreciated that each of the exemplary methods described above may be implemented, for example, by one or more components of the above-described navigation apparatus 1 and/or road guidance system 29. However, even though the exemplary structure of the above-described navigation apparatus 1 and/or road guidance system 29 may be referenced in the description, it should be appreciated that the structure is exemplary and the exemplary methods need not be limited by any of the above-described exemplary structure.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation apparatus for guiding a vehicle along a driving route, comprising:
    a memory that stores three-dimensional map data; and
    a controller configured to:
        set a first reference point on the driving route;
        set a second reference point on the driving route, the second reference point being prior to the first reference point along the driving route;
        set a third reference point on the driving route, the third reference point being after the first reference point along the driving route;
        set a triangular area having vertices corresponding to the first reference point, the second reference point, and the third reference point;
        obtain three-dimensional map data of the vicinity of the first reference point;
        generate a moving three-dimensional image for the vicinity of the first reference point using the obtained three-dimensional map data;
        display the generated moving three-dimensional motion-image;
        identify a structure in the obtained three-dimensional map data that is included in the triangular area;
        set a predetermined translucent ratio for the identified structure;
        perform translucent processing on the identified structure based on the set predetermined translucent ration to make the identified structure translucent; and
        overlap the driving route with the translucent structure.

2. The navigation apparatus according to claim 1, wherein the controller:
    obtains three-dimensional map data representing the identified structure.

3. The navigation apparatus according to claim 1, wherein the controller:
    obtains attribute data for the identified structure; and
    if the obtained attribute data indicates that the identified structure is a predetermined type of structure, obtains three-dimensional map data representing the identified structure.

4. The navigation apparatus according to claim 1, wherein the identified structure is located on an inner circumference of a turn along the route.

5. The navigation apparatus according to claim 1, wherein the controller:
    determines that a structure is within the triangular area when a circle that includes the structure is entirely within or overlaps the triangular area.

6. The navigation apparatus according to claim 1, wherein the controller obtains the three-dimensional map data around the triangular area by:
    defining a drawing reference point located at a guidance intersection;
    defining a first area including the drawing reference point and extending away from the drawing reference point in a direction against the direction of travel along the driving route;
    defining a second area including the drawing reference point and extending away from the drawing reference point in a direction travel along the driving route just prior to entering the guidance intersection;
    defining a third area including the drawing reference point and extending away from the drawing reference point in a direction of travel along the driving route just after exiting the guidance intersection; and obtaining the three-dimensional map data for the first area, second area, and third area.

7. The navigation apparatus according to claim 6, wherein the third area has a trapezoidal shape that widens as it gets further from the drawing reference point.

8. The navigation apparatus according to claim 6, wherein the first area, the second area, and the third area at least partially overlap.

9. The navigation apparatus according to claim 6, wherein the drawing reference point is at least one of a node, a center point of an intersection, and a compliment point.

10. A controller-implemented navigation method for guiding a vehicle along a driving route, comprising:
   setting a first reference point on the driving route;
   setting a second reference point on the driving route, the second reference point being prior to the first reference point along the driving route;
   setting a third reference point on the driving route, the third reference point being after the first reference point along the driving route;
   setting a triangular area having vertices corresponding to the first reference point, the second reference point, and the third reference point;
   obtaining three-dimensional map data of the vicinity of the first reference point;
   generating a moving three-dimensional image for the vicinity of the first reference point using the obtained three-dimensional map data
   displaying the generated moving three-dimensional motion-image;
   identifying a structure in the obtained three-dimensional map data that is included in the triangular area;
   setting a predetermined translucent ratio for the identified structure:
   performing translucent processing on the identified structure based on the set predetermined translucent ration to make the identified structure translucent; and
   overlapping the driving route with the translucent structure.

11. The navigation method according to claim 10, further comprising:
   obtaining three-dimensional map data representing the identified structure.

12. The navigation method according to claim 10, further comprising:
   obtaining attribute data for the identified structure; and
   obtaining, if the obtained attribute data indicates that the identified structure is a predetermined type of structure, three-dimensional map data representing the identified structure.

13. The navigation method according to claim 10,
   wherein the identified structure is located on an inner circumference of a turn along the route.

14. The navigation method according to claim 10, further comprising:
   determining that a structure is within the triangular area when a circle that includes the structure is entirely within or overlaps the triangular area.

15. The navigation method according to claim 10, further comprising:
   defining a drawing reference point located at a guidance intersection;
   defining a first area including the drawing reference point and extending away from the drawing reference point in a direction against the direction of travel along the driving route;
   defining a second area including the drawing reference point and extending away from the drawing reference point in a direction travel along the driving route just prior to entering the guidance intersection;
   the controller defining a third area including the drawing reference point and extending away from the drawing reference point in a direction of travel along the driving route just after exiting the guidance intersection; and
   the controller obtaining the three-dimensional map data for the first area, second area, and third area.

16. The navigation method according to claim 15, wherein the third area has a trapezoidal shape that widens as it gets further from the drawing reference point.

17. The navigation method according to claim 15, wherein the first area, the second area, and the third area at least partially overlap.

18. The navigation method according to claim 15, wherein the drawing reference point is at least one of a node, a center point of an intersection, and a compliment point.

19. A non-transitory computer-readable storage medium storing a computer-executable navigation program usable to guide a vehicle along a driving route, comprising:
   instructions for setting a first reference point on the driving route;
   instructions for setting a second reference point on the driving route, the second reference point being prior to the first reference point along the driving route;
   instructions for setting a third reference point on the driving route, the third reference point being after the first reference point along the driving route;
   instructions for setting a triangular area having vertices corresponding to the first reference point, the second reference point, and the third reference point;
   instructions for obtaining three-dimensional map data of the vicinity of the first reference point;
   instructions for generating a moving three-dimensional image for the vicinity of the first reference point using the obtained three-dimensional map data;
   instructions for displaying the generated moving three-dimensional motion-image;
   instructions for identifying a structure in the obtained three-dimensional map data that is included in the triangular area;
   instructions for setting a predetermined translucent ratio for the identified structure;
   instructions for performing translucent processing on the identified structure based on the set predetermined translucent ration to make the identified structure translucent; and
   instructions for overlapping the driving route with the translucent structure.

* * * * *